H. R. RICARDO.
CONNECTING ROD FOR INTERNAL COMBUSTION ENGINES.
APPLICATION FILED JULY 22, 1918.

1,303,498.

Patented May 13, 1919.

Inventor
Harry R. Ricardo
by Foster Freeman Watson Hoit
Attys

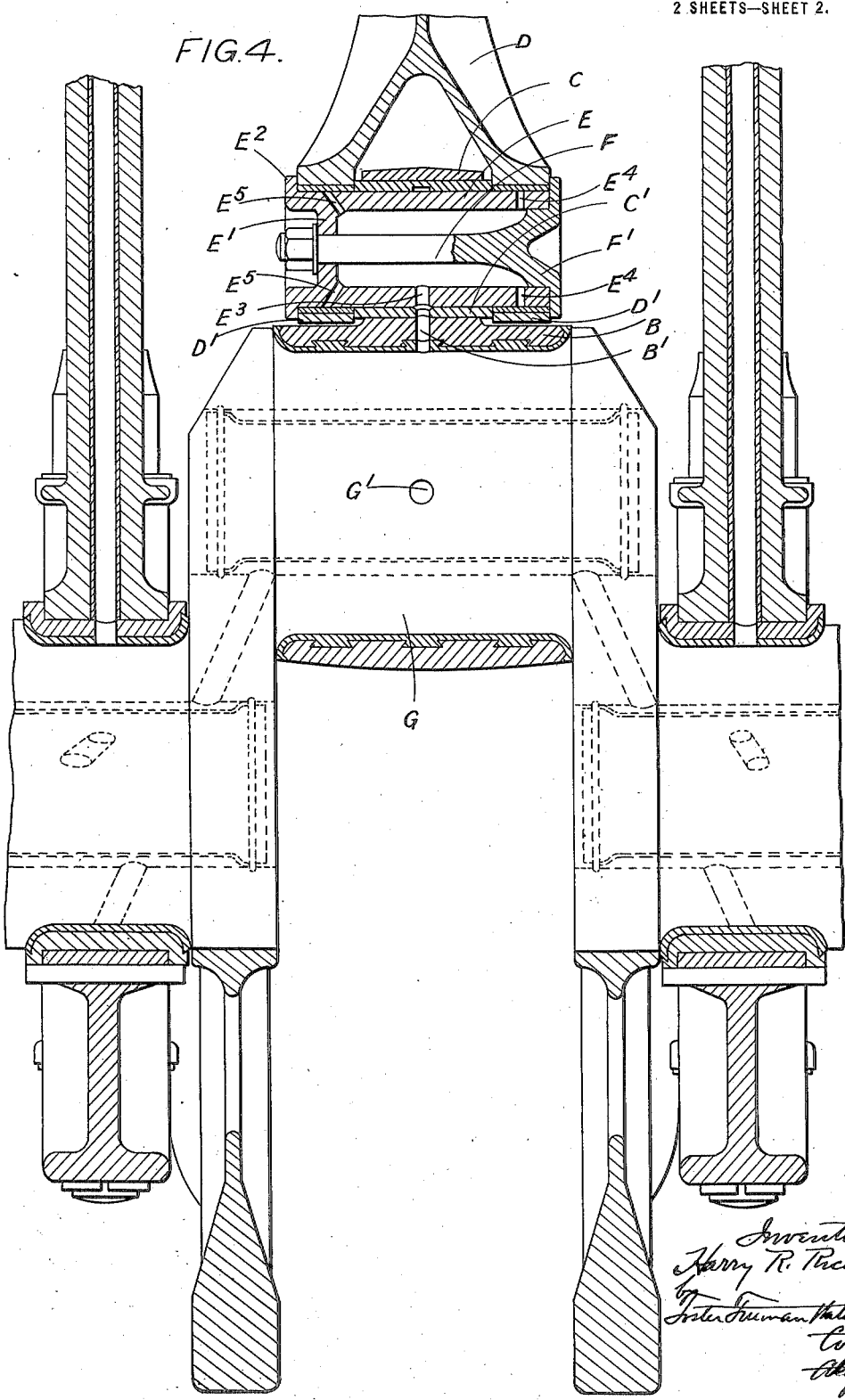

UNITED STATES PATENT OFFICE.

HARRY RALPH RICARDO, OF LONDON, ENGLAND.

CONNECTING-ROD FOR INTERNAL-COMBUSTION ENGINES.

1,303,498.  Specification of Letters Patent.  Patented May 13, 1919.

Application filed July 22, 1918. Serial No. 246,227.

*To all whom it may concern:*

Be it known that I, HARRY RALPH RICARDO, a subject of the King of England, residing at London, in England, have invented certain new and useful Improvements in Connecting-Rods for Internal-Combustion Engines, of which the following is a specification.

This invention relates to connecting-rods for internal combustion engines more especially engines of the V or like type in which the connecting-rods from two or more pistons run to a common big end formed on one of these rods and has for its object to so form this big end as to improve the connection between the separate or auxiliary rods and the big end on the main rod and to enable more satisfactory lubrication of the bearing surfaces of the auxiliary rod coupling pin or pins to be effected. The invention is also applicable to engines of the radial cylinder type.

According to this invention the forked end of a separate or auxiliary connecting rod is coupled to a single lug on the big end by a hollow pin which is not fixed but is allowed to float and a radial passage for lubricant is formed in each lug about the center of its width and in the hollow coupling pin is a corresponding central radial passage while toward each end of this pin are formed passages through which lubricant delivered through the big end to the interior of the floating pin is distributed to the connecting rod bearing surfaces on either side of the big end lug. The invention is more particularly intended for use in engines of the V-type where two connecting rods run to a single big end one of these rods being the main rod with which the big end is formed integral while the end of the other and auxiliary rod is coupled thereto. The big end is then formed with only one lug. If the invention is applied to an engine of the type having three or more groups of cylinders arranged fan-wise the big end is formed with two or more lugs disposed preferably on either side of the main connecting rod.

The passages for delivering lubricant to the coupling pin bearing surfaces can thus be so arranged that a sufficiency of oil can be supplied direct through the big end from the crank pin to which there is a forced delivery. The detail structure of this pin may vary as found desirable.

The accompanying drawings illustrate by way of example one method of putting the invention into practice. In these drawings, Figure 1 is an elevation of a main connecting rod constructed in accordance with this invention the view being taken as when looking in the direction of the crank shaft axis.

Fig. 4 is a sectional elevation of the connection between the main and auxiliary connecting rods when the parts are assembled on the crank pin, the view being taken as on the line 4—4 of Fig. 1.

Like letters indicate like parts throughout the drawings.

Figure 1:
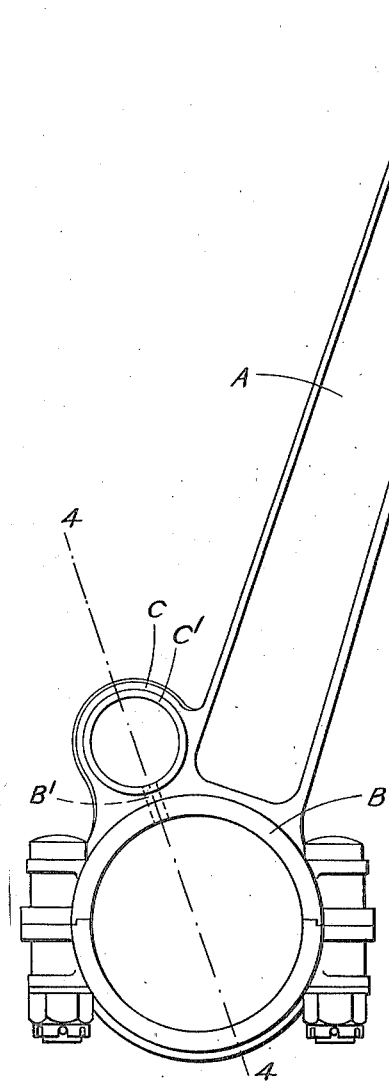
Figure 2:
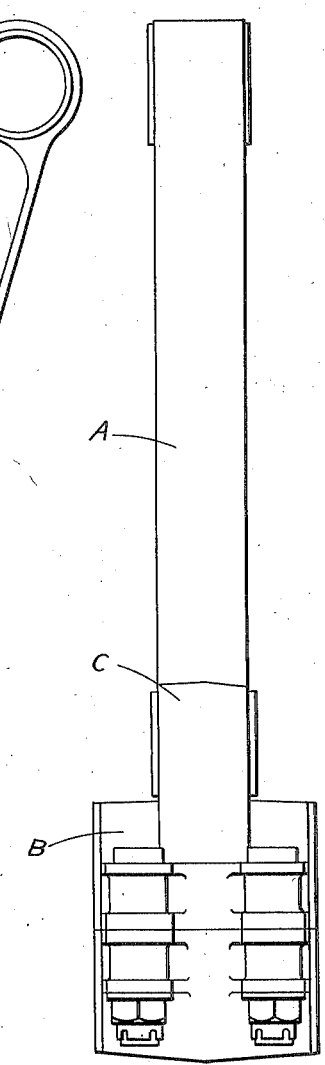
Fig. 2 is an elevation of the same rod but viewed from a point at right angles to Fig. 1.

The main connecting rod A is constructed with a big end B in the usual manner. At one side of the rod A where it joins the big end B a lug C is formed, this lug being positioned centrally with respect to the axial width of the big end B as shown in Fig. 2. The auxiliary connecting rod D has one end forked as at $D'$ the two members of this fork being adapted to lie on either side of the lug C. The forked end $D'$ of the auxiliary rod is coupled to the lug C by a floating pin shown in Fig. 4 which comprises a hollow cylindrical member E having one end closed as at $E'$ and an external flange $E^2$ formed on this end. A bolt F having a flanged or enlarged end or head $F'$ is passed through the hollow member E whose open end is closed by the head $F'$ the flange of which extends beyond the periphery of the pin E. The end of the bolt is carried through a central opening in the closed end $E'$ and drawn up by a nut. The flange $E^2$ and that formed by the head $F'$ of the bolt keep the pin in place when the hollow member E has been passed through the fork arms $D'$ and the lug C.

A radial passage $B'$ is formed through the big end B and lug C into the opening in this lug through which the coupling pin E is passed. A corresponding passage is formed in the bushing or liner $C'$ and a similar opening $E^3$ leads through the wall of the hollow pin E into its interior. Toward each end of the hollow pin E passages $E^4$ $E^5$ are formed through the wall of the pin so that lubricant can find its way from the interior of the pin to points situated about the center of the width of the bearing surfaces between the hollow pin E and the fork arms D' of the auxiliary connecting rod D.

As shown in Fig. 4 the lubricant which is preferably supplied under pressure flows through suitably disposed passages into the interior of the hollow crank pin G whence the oil finds its way through a passage G' which is formed in the center of the crank pin to the oil passage B' in the big end B and the central part of the pin E within the lug C. Thence oil can pass through the passage $E^3$ into the hollow coupling pin E and so by way of the passages $E^4$, $E^5$ to the bearing surfaces toward the ends of this pin. Thus oil can be effectively distributed to the periphery of the coupling pin E throughout its length, the oil passages being so arranged that they can be readily formed and are not liable to obstruction.

The coupling pin E is not fixed against rotation but floats freely both in the lug C and also in the fork arms D'. Hence wear takes place evenly throughout the bearing surfaces and the distribution of lubricant to these bearing surfaces is facilitated by the rotation of the pin with relation to the bearing surfaces in the lug C and in the fork arms D'.

The manner in which lubricant is supplied to the coupling pin may vary, the arrangement illustrated in Fig. 4 being by way of example. If desired lubricant may be delivered by way of the rod A or along the auxiliary rod D or both.

Figure 3:
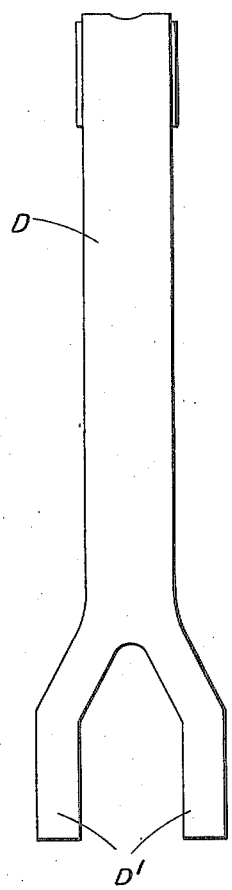
Fig. 3 is an elevation of the auxiliary connecting rod viewed from the same aspect as Fig. 2.

The invention may be applied to the connecting rods of an engine of the type in which three groups or sets of cylinders are disposed in a double V or broad arrow manner with relation to the crank shaft. In that case the connecting rod of each cylinder in the center group is preferably the main rod and has two lugs such as C formed on the big end, one on each side of the main rod where the big end joins the end of the rod. Each lateral rod is then constructed as the rod D shown in Fig. 3 with a forked end D' and these fork arms are coupled to the corresponding lug on the big end by a floating pin such as E F. Two passages for lubricant are arranged in the big end through which oil can flow to each coupling pin. Similarly it may be employed for any number of connecting rods as in a radial engine where all these rods are coupled to a common big end.

What I claim as my invention and desire to secure by Letters Patent is:—

1. In a connecting rod for an internal combustion engine, the combination of a main connecting rod having a big end on which is formed a lug, an auxiliary connecting rod having a forked end adapted to embrace and be coupled to said lug, a hollow floating pin which passes through the forked end of the auxiliary connecting rod and the lug on the big end of the main connecting rod and couples them together, said lug and big end being formed with a radial passage for lubricant, said floating pin having a corresponding radial passage and passages through its wall positioned toward its ends through which lubricant delivered from the big end to the interior of the hollow pin is distributed to the auxiliary connecting rod bearing surfaces on either side of the big end lug as set forth.

2. In a connecting rod for an internal combustion engine, the combination of a crank shaft, a hollow crank pin, said shaft being formed with passages through which lubricant is supplied to the interior of the crank pin, said crank pin being formed with a radial passage through its wall, a main connecting rod having a big end on which is formed a lug and auxiliary connecting rod having a forked end adapted to embrace and be coupled to said lug, a hollow floating pin which passes through the forked end of the auxiliary connecting rod on the big end of the main connecting rod and couples them together, said lug and big end being formed with a radial passage corresponding in position to the radial passage in the crank pin, said floating pin having a corresponding passage and also formed with passages through its wall positioned toward its ends through which lubricant delivered from the crank pin through the big end to the interior of the hollow pin is distributed to the auxiliary connecting rod bearing surfaces on either side of the big end lug as set forth.

3. A connecting rod construction for internal combustion engines comprising in combination, a hollow crank pin, a main connecting rod having a bearing at one end on said pin, a second connecting rod having a bearing at one end on said main rod, said pin formed with a lubricant passage through its wall, and means for conducting lubricant to said bearing of the second rod including a passage formed in the bearing of the main rod in the same transverse plane as the passage in the pin.

4. A connecting rod construction for internal combustion engines comprising in combination, a hollow crank pin, a main connecting rod having a bearing at one end on said pin, a second connecting rod having a forked end, a hollow pivot pin securing said forked end to the main rod, said crank pin formed with a lubricant passage through its wall, said main rod having a corresponding passage, and means for conducting lubricant from said latter passage to the exterior surface of said pivot pin.

5. In a connecting rod construction for an internal combustion engine, the combination of a connecting rod having a big end on which is formed a lug, a second connecting rod having a forked end adapted to embrace and be coupled to the said lug, a hollow pin which passes through the forked end of the second connecting rod and the lug on the big end of the first mentioned connecting rod and couples them together, said big end and lug being formed with a passage for lubricant, said hollow pin having a corresponding passage through its wall and also formed with passages positioned toward its end through which lubricant delivered from the big end to the interior of the hollow pin is distributed to the second connecting rod bearing surfaces on either side of the big end lug as set forth.

6. In a connecting rod for an internal combustion engine, the combination of a crank shaft, a hollow crank pin, said shaft being formed with passages through which lubricant is supplied to the interior of the crank pin, said crank pin having a passage through its wall, a connecting rod having a big end, a second connecting rod having a forked end adapted to be coupled to the main connecting rod, a hollow pin which passes through the forked end of the second connecting rod and the main connecting rod and couples them together, said main rod being formed with a lubricant passage corresponding in position to the passages in the crank pin and extending from the crank pin to said hollow pin, said hollow pin having a passage through its wall corresponding to the passage in the main rod and also formed with passages positioned toward its ends through which lubricant delivered from the crank pin is distributed to the second connecting rod bearing surfaces.

In testimony whereof I have signed my name to this specification.

HARRY RALPH RICARDO.